United States Patent [19]

Russo

[11] 4,013,202

[45] Mar. 22, 1977

[54] DEVICE FOR CONVENIENTLY LIFTING AND TRANSPORTING A LARGE SHEET OF MATERIAL

[76] Inventor: Herman J. Russo, 209 Scribner Ave., Norwalk, Conn. 06854

[22] Filed: Mar. 2, 1976

[21] Appl. No.: 663,063

[52] U.S. Cl. ............................. 224/45 M; 294/16
[51] Int. Cl.² ........................................ B65D 71/00
[58] Field of Search ............ 224/45 P, 45 M, 45 R, 224/45 T; 294/DIG. 1, 15, 16, 86, 27, 19, 104, 67 BC; 211/41

[56] References Cited

UNITED STATES PATENTS

| | | | |
|---|---|---|---|
| 1,760,885 | 6/1930 | Prelesnik | 294/DIG. 1 |
| 2,654,630 | 10/1953 | Renfroe | 294/DIG. 1 |
| 2,771,014 | 11/1956 | Tolcher | 224/45 R |
| 2,776,856 | 1/1957 | Ingram | 294/16 |
| 3,162,473 | 12/1964 | George | 224/45 T |
| 3,281,031 | 10/1966 | Shapiro | 294/16 |

Primary Examiner—Robert J. Spar
Assistant Examiner—Kenneth Noland
Attorney, Agent, or Firm—Haynes N. Johnson

[57] ABSTRACT

A carrying device is arranged to permit a workman to easily lift and transport large sheets of construction material such as plywood, wallboard and the like. The carrying device has a framework forming upper and lower lifting regions, preferably located to rest upon the shoulder and against the hip. The framework additionally defines a plane against which a sheet of material may be placed, and pivotally supports, adjacent said plane, cam means which are mounted eccentrically, arranged to be gravitationally rotated into gripping engagement with a sheet of material placed against said plane, and arranged to be rotated into tighter gripping engagement by gravitational forces exerted on the sheet of material as the framework is lifted upwardly. Preferably the cam means comprises a pair of cams mounted opposite a pair of tubular frame members defining the plane, the cams being joined for movement in tandem by a connecting rod to facilitate release of the sheet material from the carrier by simply raising the connecting rod. Preferably the framework comprises a substantially vertical U-shaped tubular member joined at its upper ends to a substantially horizontal U-shaped tubular member having downwardly extending mounting arms attached to the cam means. The carrying device is lightweight and inexpensive, and substantially simplifies the task of lifting and transporting a large sheet of construction material.

2 Claims, 4 Drawing Figures

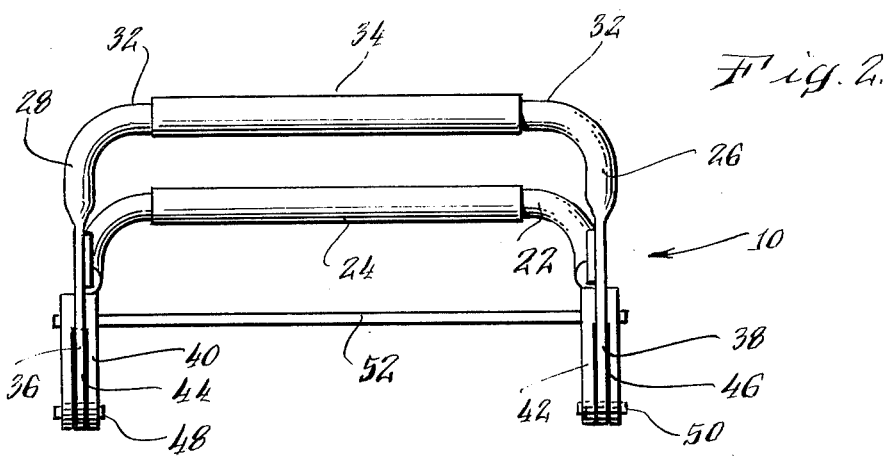
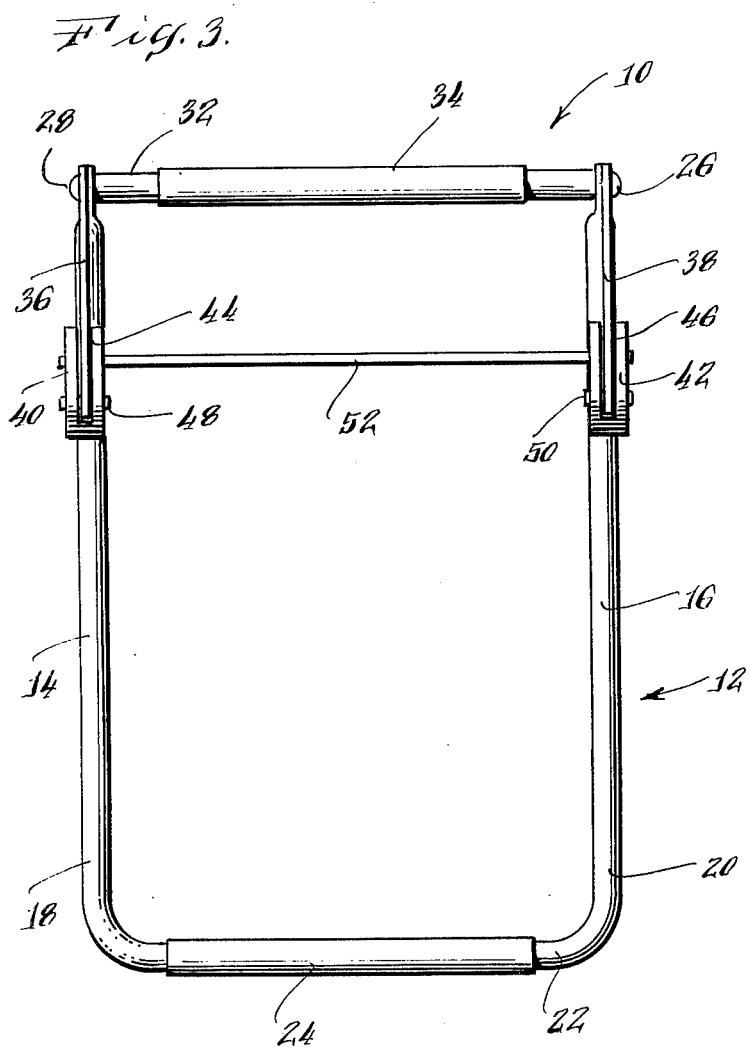
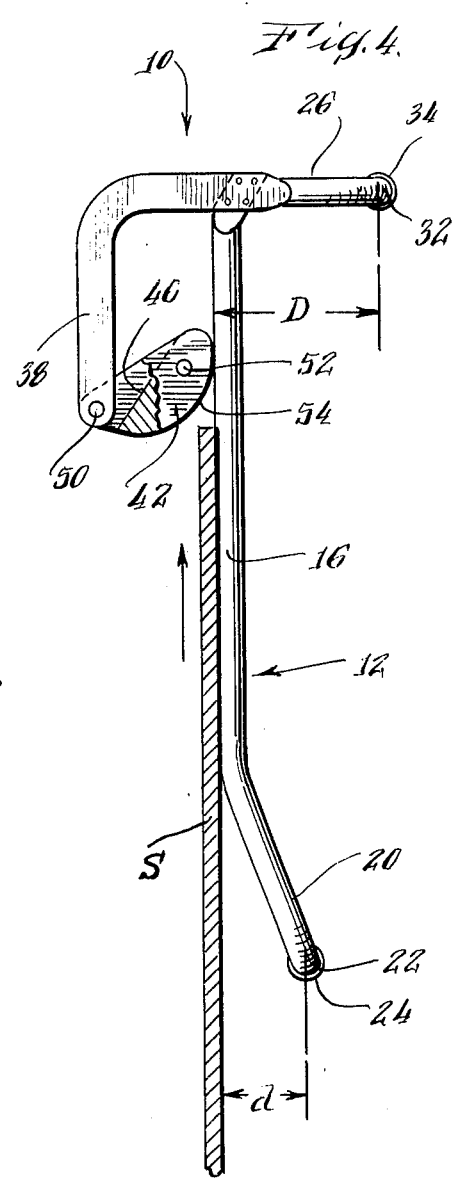

DEVICE FOR CONVENIENTLY LIFTING AND TRANSPORTING A LARGE SHEET OF MATERIAL

BACKGROUND OF THE INVENTION

1. Field of the Invention

This invention relates to carrying devices, and more particularly to devices for manually lifting and carrying large individual sheets of material.

2. Description of the Prior Art

The construction industry utilizes enormous quantities of material formed in large, standard-sized sheets. Plywood and wallboard, for example, come in standard sizes of 4 × 8 feet or 4 × 12 feet. Typically the large sheets of material are delivered to the construction site and piled. As the sheets are needed, a workman must lift and transport the individual sheets from the pile to the work site. Because of their large size, the sheets are cumbersome and difficult to carry, tiring the workman and causing wastage as the awkward sheets frequently are dropped or bumped and thus mutilated.

Heretofore, no satisfactory means has been devised which would permit a workman to conveniently lift and transport large sheets of construction material such as plywood, wallboard and the like.

SUMMARY OF THE INVENTION

Objects of the present invention are to provide a carrying device which will enable a workman to easily and conveniently lift and transport large sheets of construction material, and to provide such a device which is easy to use, reliable, and inexpensive to make. Still another object of the invention is to provide such a carrying device in a form which is suitable for practical use in the construction industry.

In a preferred embodiment of the invention to be described hereinbelow in detail, the carrying device is characterized by a framework forming lifting regions and defining a plane against which an upright sheet of material may be placed. Cam means are pivotally supported by the frame adjacent said plane, the cam means being mounted eccentrically and arranged to be rotated into tighter gripping engagement with a sheet of material by the gravitational forces exerted upon the sheet as the framework is lifted. The cam means preferably is arranged to gravitationally rotate into gripping engagement with an upright sheet of material to automatically secure the sheet in the carrying device.

In further aspects of the invention, the cam means comprises a pair of cams joined for common movement by a connecting rod which further serves as a handle to facilitate release of the cams. The framework is formed from a substantially vertical U-shaped frame member whose crossbar forms a lower lifting region and whose upper ends are joined to a substantially horizontal U-shaped frame member whose crossbar forms an upper lifting region, and whose ends are bent downwardly and are attached to the cam means. Preferably the upper and lower crossbars are offset from the carrying plane defined by the framework to simplify carrying of the sheets.

Other objects, aspects and advantages of the invention will be pointed out in, or apparent from, the detailed description hereinbelow considered together with the following drawings.

DESCRIPTION OF THE DRAWINGS

FIG. 2 is a top view of the carrying device of FIG. 1;

FIG. 3 is a side view of the carrying device; and

FIG. 4 is a front view of the carrying device.

DESCRIPTION OF THE PREFERRED EMBODIMENT

Figure 1:
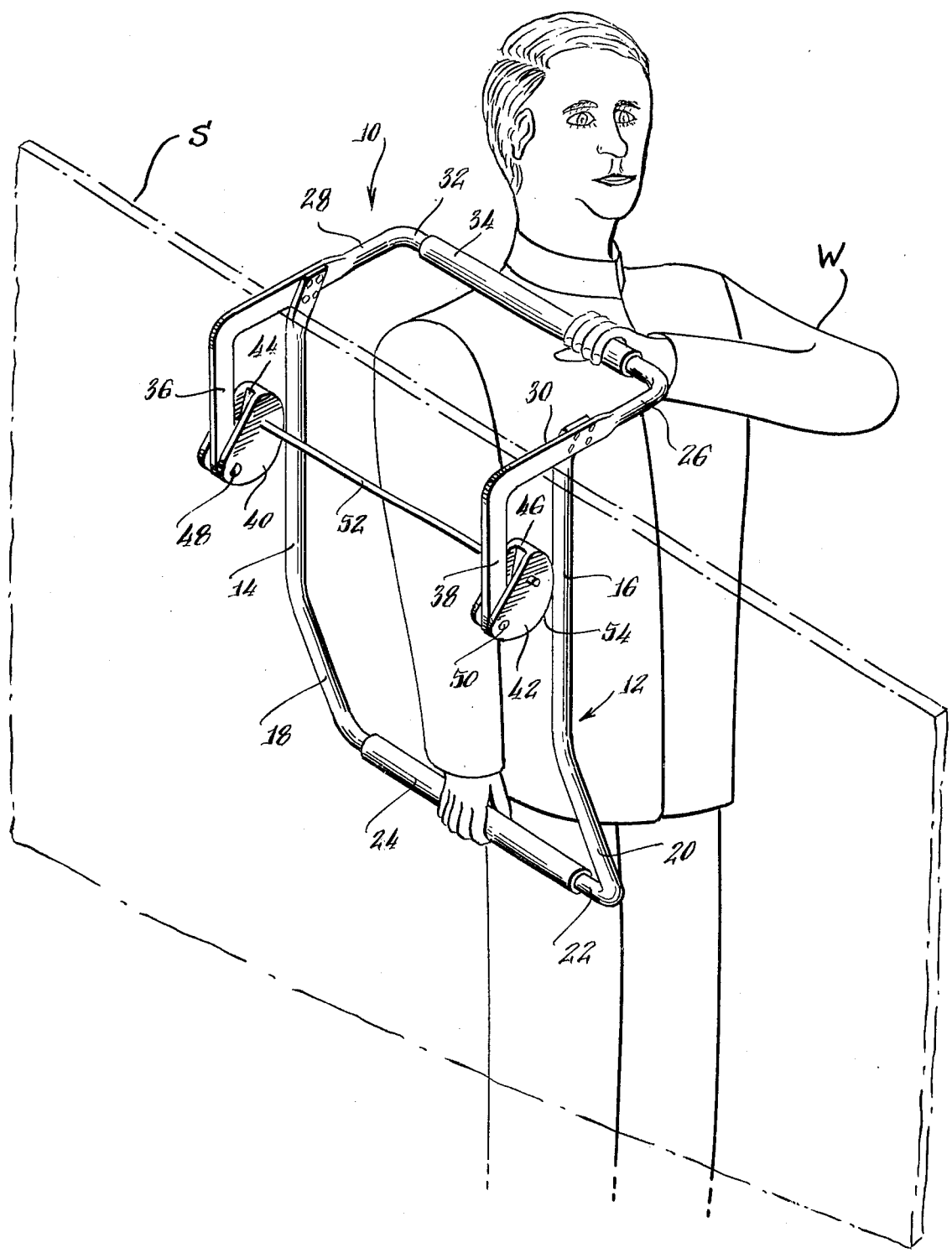
FIG. 1 is a perspective view showing the use of a carrying device constructed in accordance with the present invention.

FIG. 1 illustrates a sheet carrying device 10 arranged in accordance with the present invention to aid a workman W in lifting and transporting a large sheet S of construction material (shown in phantom lines). As will be explained below, the sheet carrying device 10 is arranged to easily and automatically lock onto an upright sheet S for lifting and carrying by means of conveniently located hand grips and supports, and, when done, to be readily released from the sheet S for further use.

In the preferred embodiment illustrated in FIGS. 1 through 4, the sheet carrying device 10 comprises a substantially vertical U-shaped tubular frame member 12 having parallel arms 14 and 16 defining a plane against which the sheet of material S is placed (FIG. 4). At its lower end, frame member 12 has arms 18 and 20 bent at an angle to the plane defined by arms 14 and 16 so as to position a crossbar 22, which forms a lower lifting region, a distance $d$ away from the sheet S to provide finger clearance therefrom. A tubular grip 24, made for example of rubber, may be placed over crossbar 22 to facilitate gripping.

At the upper ends of arms 14 and 16, frame member 12 is joined to a substantially horizontal U-shaped tubular frame member 26. As illustrated, frame member 26 has side arms 28, 30 joined approximately at their midpoints to the ends of arms 14, 16, and has a crossbar 32 offset a distance D from the sheet S to form an upper lifting region. As illustrated, gripping material 34 may be placed over crossbar 32. Frame member 26 further has flat mounting arms 36, 38 depending vertically from the ends of side arms 28, 30. The mounting arms 36, 38 are parallel to one another and to the frame arms 14, 16.

Pivotally supported from the lower ends of mounting arms 36, 38 are gripping cams 40, 42. The cams 40, 42 have slots 44, 46 therein to receive the flat mounting arms 36, 38 therein, the cams being pivotally joined to the mounting arms by means of pivot pins 48, 50. A connecting rod 52 joins cams 40, 42 together and causes them to swing in tandem.

As shown in FIG. 4, the gripping cams 40, 42 each have a curved gripping surface 54 which is eccentrically mounted by pivot pins 48, 50 and is arranged to be rotated by gravitational forces acting on the cams to bring the surface into gripping engagement with a sheet of material S placed against frame arms 14, 16. The cams 40, 42 are disposed opposite the frame arms 14, 16 and are sized so that, when no sheet of material is present, the gripping surface 54 on each cam will contact the frame arms 14, 16 above pivot pins 48, 50. Accordingly, the gripping cams 50 have a limited range of movement, being permitted to swing from a lower position in contact with frame arms 14, 16 to an upper position limited by contact between the end wall 56 of slots 44, 46 and mounting arms 36, 38. The curvature of gripping surface 54 allows the device 10 to grip sheets S of varying thickness, and thereby to carry all the different standard sizes of construction material.

To attach sheet carrying device 10 to a sheet of material S, the device is simply placed with arms 14, 16 against the sheet S and then the device is descended. The top edge of the sheet S raises the gripping cams 40, 42, and once the sheet is between frame arms 14, 16 and cams 40, 42, gravity tends to rotate the cams so as to maintain gripping engagement with the sheet S. Using crossbars 22 and 32, the device 10 is lifted, and it can readily be seen that the gravitational forces exerted on the sheet S as the frame is lifted pulls frictionally on the cams and forces the cams to be rotated into tighter gripping engagement with the sheet S. An effective frictional lock results, and the sheet is securely held for lifting and transport by means of the conveniently located lifting regions formed by crossbars 22 and 32. To further ease the task of carrying sheets S, the crossbar 32 preferably is located relative to the crossbar 22, as shown in FIG. 1, so that the crossbar 32 may rest upon a shoulder, while the crossbar 22 rests against a hip.

When it is desired to release the sheet S from carrying device 10, the sheet is first supported upon its lower edge, and connecting rod 52 is lifted to disengage cams 40, 42 from sheet S. The carrying device 10 then may be simply lifted upwardly away from sheet S.

Construction of sheet carrying device 10 is simple and economical. The lower frame member 12 may be formed from aluminum tubing using straightforward bending techniques. The upper ends of frame arms 14, 16 are flattened for joining to upper frame member 26. The upper frame member 26 is also formed from bent tubing, which is flattened from the region connected to the lower frame member 12 to the ends of mounting arms 36, 38. The gripping cams 40, 42 preferably are formed, e.g., by molding, from a material such as plastic or hard rubber, and gripping surface 54 is provided with a high coefficient of friction either by mechanically embossing the surface or by forming the surface from a high friction material such as rubber. Assembly of device 10 is accomplished easily by riveting the frame members together, and by joining the cams together with the connecting rod 52 and to the frame members with pivot pins 48 and 50.

The sheet carrying device 10 described above provides several practical advantages. It greatly simplifies the task of lifting and transporting large sheets of construction material by providing conveniently placed lifting regions which permit use not only of the hands, but also use of the shoulders for carrying. Use of the device is uncomplicated, since it automatically attaches to a sheet of material, yet is readily released therefrom. The use of the device does not harm sheets S, and results in less multilation thereof. Finally, the device is sufficiently simple in its construction to be both inexpensive and lightweight, and thus practical for use in the construction industry.

Although a specific embodiment of the invention has been disclosed herein in detail, it is to be understood that this is for the purpose of illustrating the invention, and should not be construed as necessarily limiting the scope of the invention, since it is apparent that many changes can be made to the disclosed structure by those skilled in the art to suit particular applications.

I claim:

1. A carrying device arranged to permit a workman to easily lift and transport large sheets of construction material such as plywood, wallboard and the like, comprising:

a substantially U-shaped lower frame member having arms defining a plane against which a sheet of material may be placed and a crossbar, offset from said plane, forming a lower lifting region;

a substantially U-shaped upper frame member joined to the lower frame member and having a crossbar offset from said plane and forming an upper lifting region and having mounting arms adjacent to said plane;

cam means mounted eccentrically upon said mounting arms adjacent said plane, said cam means gravitationally rotating into gripping engagement with a sheet of material placed against said plane, and being rotated into tighter gripping engagement by gravitational forces exerted on the sheet of material as the frame members are lifted upwardly;

the cam means including a pair of cams mounted opposite the lower frame arms and rotatable into engagement therewith, the cams being joined for tandem motion by a connecting rod.

2. A carrying device arranged to permit a workman to easily lift and transport large sheets of construction material such as plywood, wallboard and the like, comprising:

frame means providing lifting regions and defining a plane against which a sheet of material may be placed;

cam means pivotally supported by the frame means adjacent said plane, said cam means being mounted eccentrically for rotation into tighter gripping engagement with a sheet of material by gravitational forces exerted on the sheet of material as the frame is lifted upwardly; and said frame means including a lower frame member having frame arms defining said plane and a crossbar forming a lower lifting region, and an upper frame member joined to the lower frame member and having mounting arms for said cam means and a crossbar forming an upper lifting region, said upper and lower crossbars being offset from said plane on one side thereof.

* * * * *